United States Patent
Miyamoto

(10) Patent No.: US 12,397,359 B2
(45) Date of Patent: Aug. 26, 2025

(54) METALWORKING PORTABLE CUTTING MACHINE

(71) Applicant: MAKITA CORPORATION, Anjo (JP)

(72) Inventor: Gen Miyamoto, Anjo (JP)

(73) Assignee: MAKITA CORPORATION, Anjo (JP)

( * ) Notice: Subject to any disclaimer, the term of this patent is extended or adjusted under 35 U.S.C. 154(b) by 322 days.

(21) Appl. No.: 18/131,220

(22) Filed: Apr. 5, 2023

(65) Prior Publication Data

US 2023/0390839 A1    Dec. 7, 2023

(30) Foreign Application Priority Data

Jun. 6, 2022    (JP) ................. 2022-091564

(51) Int. Cl.
*B23D 59/00* (2006.01)

(52) U.S. Cl.
CPC ................... *B23D 59/006* (2013.01)

(58) Field of Classification Search
CPC .................................................. B23D 59/006
See application file for complete search history.

(56) References Cited

U.S. PATENT DOCUMENTS

| | | | | |
|---|---|---|---|---|
| 5,321,890 | A * | 6/1994 | LaBlue | B23Q 11/0053 |
| | | | | 30/381 |
| 6,557,261 | B1 * | 5/2003 | Buser | B23D 59/006 |
| | | | | 30/390 |
| 7,628,102 | B2 * | 12/2009 | Kamiya | B23D 59/006 |
| | | | | 83/100 |
| 2005/0120845 | A1 * | 6/2005 | Kamiya | B23Q 11/127 |
| | | | | 83/78 |
| 2006/0169111 | A1 * | 8/2006 | Kozlowski | B23D 59/003 |
| | | | | 83/13 |
| 2010/0000095 | A1 * | 1/2010 | Matsumoto | B23D 59/006 |
| | | | | 30/124 |
| 2010/0089497 | A1 * | 4/2010 | Keenan | B23Q 11/0046 |
| | | | | 409/137 |
| 2015/0328796 | A1 * | 11/2015 | Okouchi | B25F 5/02 |
| | | | | 30/388 |
| 2016/0016270 | A1 * | 1/2016 | Batres | B01D 46/0002 |
| | | | | 83/100 |
| 2016/0176064 | A1 * | 6/2016 | Okouchi | B27B 9/00 |
| | | | | 30/374 |
| 2016/0368166 | A1 * | 12/2016 | Numata | B23D 45/16 |
| 2021/0362252 | A1 * | 11/2021 | Kimura | B23D 45/16 |
| 2023/0201934 | A1 * | 6/2023 | Funabiki | B23D 59/006 |
| | | | | 30/390 |
| 2023/0390839 | A1 * | 12/2023 | Miyamoto | B23D 59/006 |

FOREIGN PATENT DOCUMENTS

| | | |
|---|---|---|
| JP | 563-031921 Y2 | 8/1988 |
| JP | 2561668 Y2 | 2/1998 |
| JP | 2019-198912 A | 11/2019 |

* cited by examiner

*Primary Examiner* — Sean M Michalski
(74) *Attorney, Agent, or Firm* — Oliff PLC

(57) ABSTRACT

A metalworking portable cutting machine has a lid for an outlet of a dust collector box with improved operability. A metalworking portable cutting machine includes a cutting machine body including a blade, and a dust collector box to collect a chip resulting from cutting. The dust collector box includes an outlet to discharge the chip, and a lid to open or close the outlet. The lid includes a heat dissipater on a part of a surface of the lid.

12 Claims, 15 Drawing Sheets

METALWORKING PORTABLE CUTTING MACHINE

CROSS-REFERENCE TO RELATED APPLICATIONS

This application claims the benefit of priority to Japanese Patent Application No. 2022-091564, filed on Jun. 6, 2022, the entire contents of which are hereby incorporated by reference.

BACKGROUND

1. Technical Field

The present disclosure relates to a metalworking portable cutting machine to be held and operated by an operator with hands for cutting metal.

2. Description of the Background

For example, a metalworking portable cutting machine including a tipped saw blade for metal, referred to as a metal cutter, includes a dust collector box for collecting sparks resulting from cutting and high-temperature chips left after the sparks cool. As described in Japanese Unexamined Patent Application Publication No. 2019-198912, a dust collector box has a rear outlet through which collected chips are to be removed. The outlet can be open and closed with a lid. The user opens the lid to remove the chips in the dust collector box through the outlet. A tipped saw blade is a type of cutting blade having tips and a metal base prepared separately and then welded together.

BRIEF SUMMARY

The lid may be heated to high temperature with the chips in the dust collector box. The lid is thus to be open or closed with caution. The lid is thus to be more easily operable. One or more aspects of the present disclosure are directed to a metalworking portable cutting machine including a lid for an outlet of a dust collector box with improved operability.

A first aspect of the present invention provides a metalworking portable cutting machine, including:
 a cutting machine body including a blade; and
 a dust collector box to collect a chip resulting from cutting, the dust collector box including
  an outlet to discharge the chip, and
  a lid to open or close the outlet, the lid including a heat dissipater on a part of a surface of the lid.

In this structure, the heat dissipater allows efficient dissipation of heat from the lid. The lid is less likely to be hot and is easily operable when being open and closed.

A second aspect of the present invention provides a metalworking portable cutting machine, including:
 a cutting machine body including a blade; and
 a dust collector box to collect a chip resulting from cutting, the dust collector box including a box body, the box body including
  a first body comprising a first synthetic resin, the first body including a metal plate integral with an inner surface of the first body, and
  a second body comprising a second synthetic resin being more heat-resistant than the first synthetic resin.

The use of metal in the first body alone reduces the weight of the dust collector box and allows the second body to improve the heat resistance of the dust collector box.

DETAILED DESCRIPTION

As shown in FIGS. 1 to 4, a metalworking portable cutting machine 1 according to an embodiment includes a tipped saw blade for metal and is also referred to as a metal cutter. The metalworking portable cutting machine 1 includes a base 10 and a cutting machine body 20. The base 10 is placed in contact with the upper surface of a workpiece 2. The cutting machine body 20 is supported on the upper surface of the base 10. The base 10 is a rectangular flat plate with its lower surface in contact with the upper surface of the workpiece 2. The user is behind the metalworking portable cutting machine 1 and moves the metalworking portable cutting machine 1 forward for cutting. The front herein refers to the cutting direction. The rear herein refers to the direction toward the user. The lateral direction is defined as viewed from the user.

Figure 5:
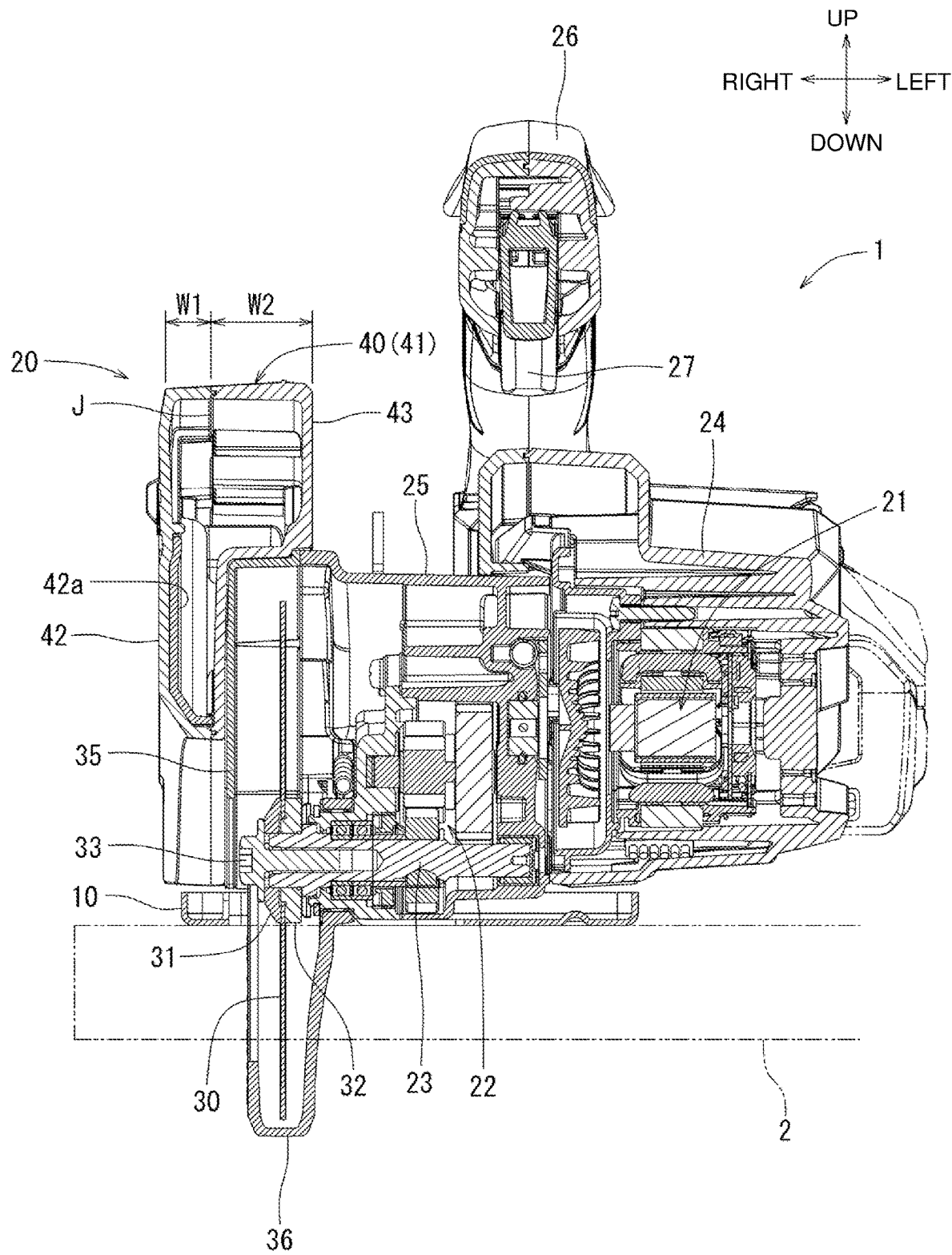
FIG. 5 is a cross-sectional view taken along line V-V in FIG. 1, as viewed in the direction indicated by arrows.
Figure 6:
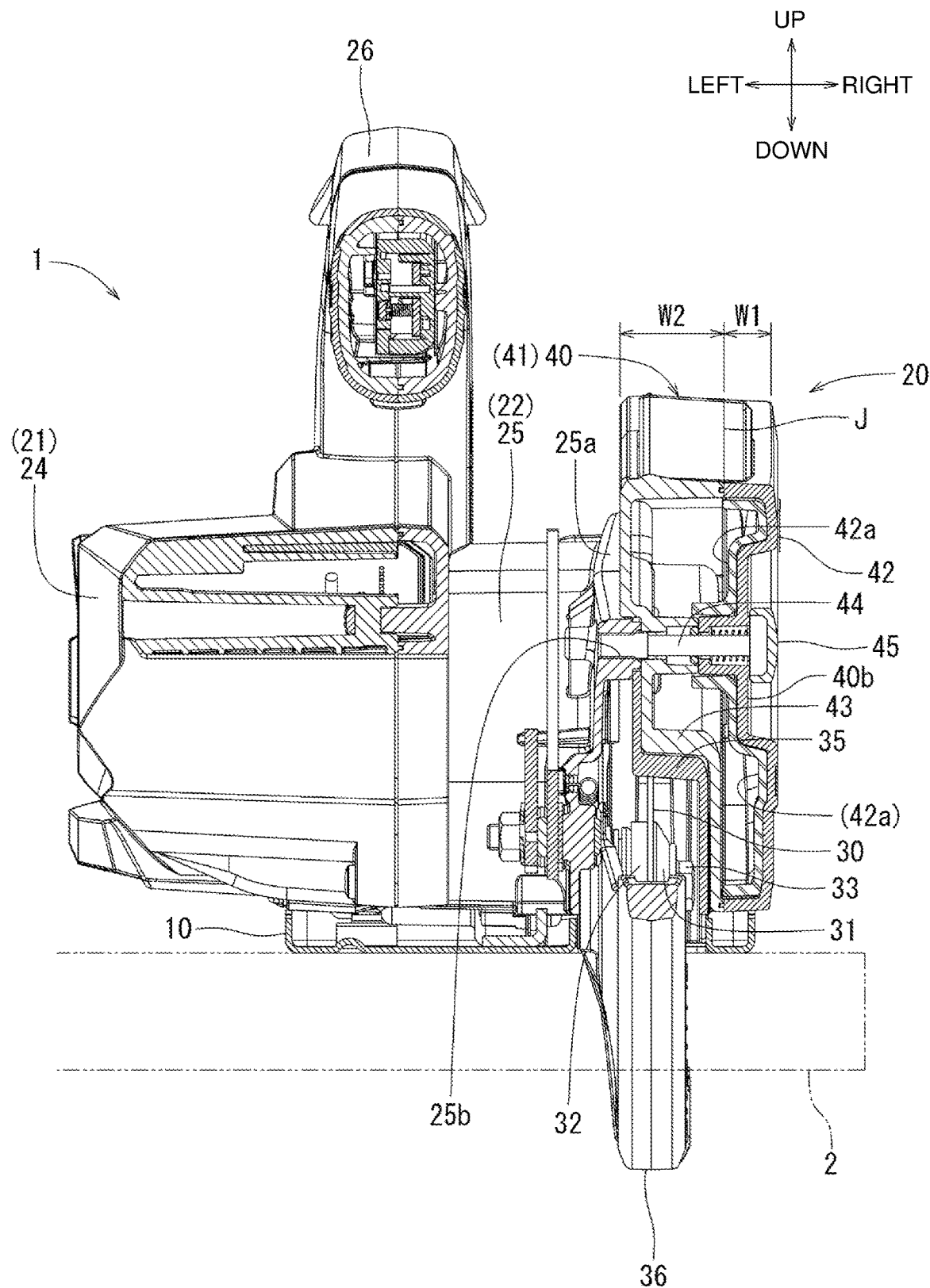
FIG. 6 is a cross-sectional view taken along line VI-VI in FIG. 1, as viewed in the direction indicated by arrows.
Figure 7:
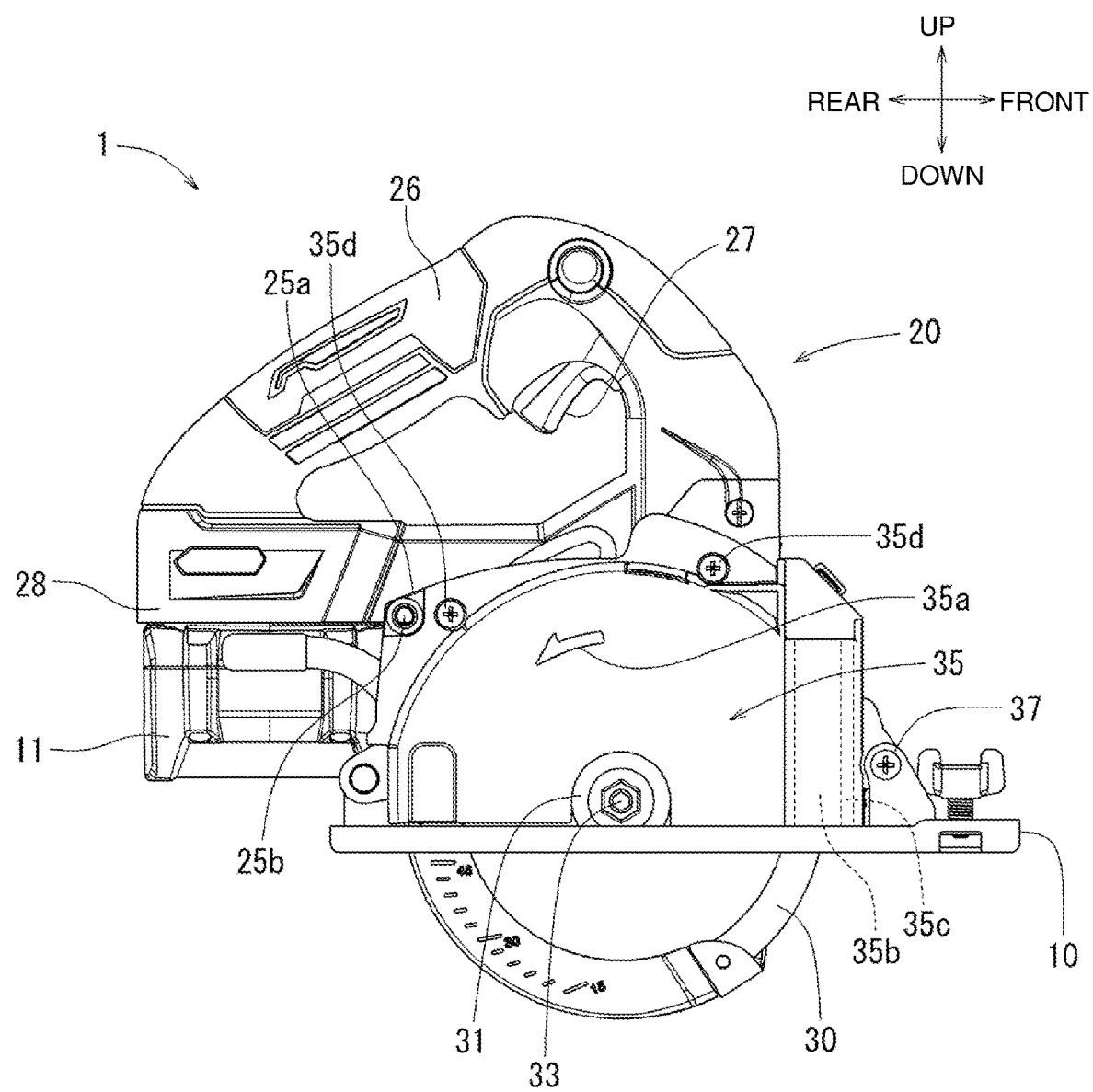
FIG. 7 is a right side view of the metalworking portable cutting machine with its dust collector box detached.

As shown in FIGS. 5 to 7, the cutting machine body 20 includes an electric motor 21 as a driving source and a blade 30. The blade 30 is a circular plate rotatable by the electric motor 21. The electric motor 21 is, for example, a high-power brushless motor that is compact in a direction along its axis. Rotation from the electric motor 21 is output to an output shaft 23 through a reduction gear 22. A gear housing 25 is connected to the right end of a motor housing 24.

A loop handle 26 is located above the joint between the motor housing 24 and the gear housing 25. A switch lever 27 is located on the inner periphery of the handle 26. The user turns on the switch lever 27 with the fingers holding the handle 26 to activate the electric motor 21.

A battery mount 28 is located at the rear of the handle 26. The battery mount 28 receives a battery pack 11. The battery pack 11 is, for example, a lithium-ion battery attachable in a slidable manner. The electric motor 21 is powered by the battery pack 11 mounted on the battery mount 28. The battery pack 11 detached from the battery mount 28 may be charged with a separate charger to allow repeated use.

As shown in FIGS. 5 to 7, a stationary cover 35 formed from a transparent resin is connected to a flange 25a at the right end of the gear housing 25. The stationary cover 35 is formed from polycarbonate and is connected to the gear housing 25 with two fastener screws 35d. The stationary cover 35 and the flange 25a on the gear housing 25 are connected together into a cover. The output shaft 23 protrudes into the stationary cover 35 to receive the blade 30. The blade 30 is held between an outer flange 31 and an inner flange 32 in a direction along its thickness. In this state, the blade 30 is fastened to the output shaft 23 with a fastener screw 33. The blade 30 is, for example, a circular saw blade for cutting metal materials, which is also referred to as a tipped saw blade.

The blade 30 has its substantially upper half (portion above the upper surface of the base 10) covered with the stationary cover 35 and the flange 25a on the gear housing 25. The blade 30 cutting into the workpiece 2 produces chips in a cutting portion 3. The chips are blown up by the rotating blade 30. The stationary cover 35 includes a rectangular dust collector duct 35b at its front. The dust collector duct 35b is located above the cutting portion 3. A metal plate 35c, which is a plate of steel, is located on the front inner peripheral surface of the dust collector duct 35b. The metal plate 35c protects the stationary cover 35 from high-temperature chips hitting the stationary cover 35. The chips blown up from the cutting portion 3 are thus guided through the dust collector duct 35b and flow into a dust collector box 40.

An arrow 35a on the right side of the stationary cover 35 indicates the rotation direction of the blade 30.

The blade 30 has its substantially lower half (portion below the lower surface of the base 10) covered with a movable cover 36. The movable cover 36 is rotatably supported on the right side of the gear housing 25. As the movable cover 36 rotates, the cutting edge of the blade 30 is exposed below the lower surface of the base 10. The movable cover 36 is urged in the closing direction. As the metalworking portable cutting machine 1 is moved for cutting, the movable cover 36 pressed against the workpiece 2 gradually opens against the urging force.

The cutting machine body 20 is supported on the upper surface of the base 10 with a swing support 37. The swing support 37 allows the cutting machine body 20 to swing vertically. The depth of a cut created by the blade 30 into the workpiece 2 is adjustable by changing the vertical swing position of the cutting machine body 20.

Figure 8:
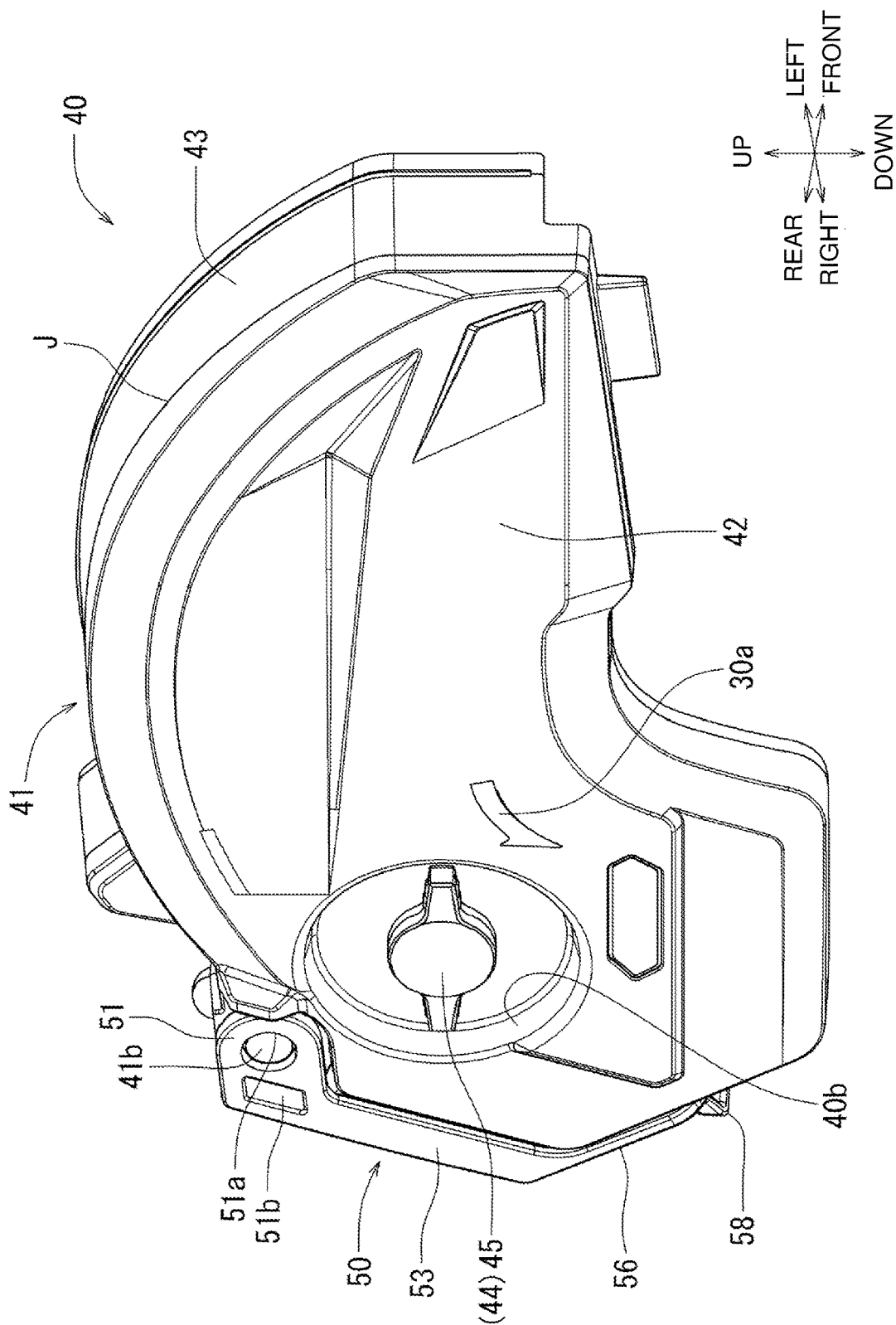
FIG. 8 is a perspective view of the dust collector box as viewed diagonally from the right front.
Figure 9:
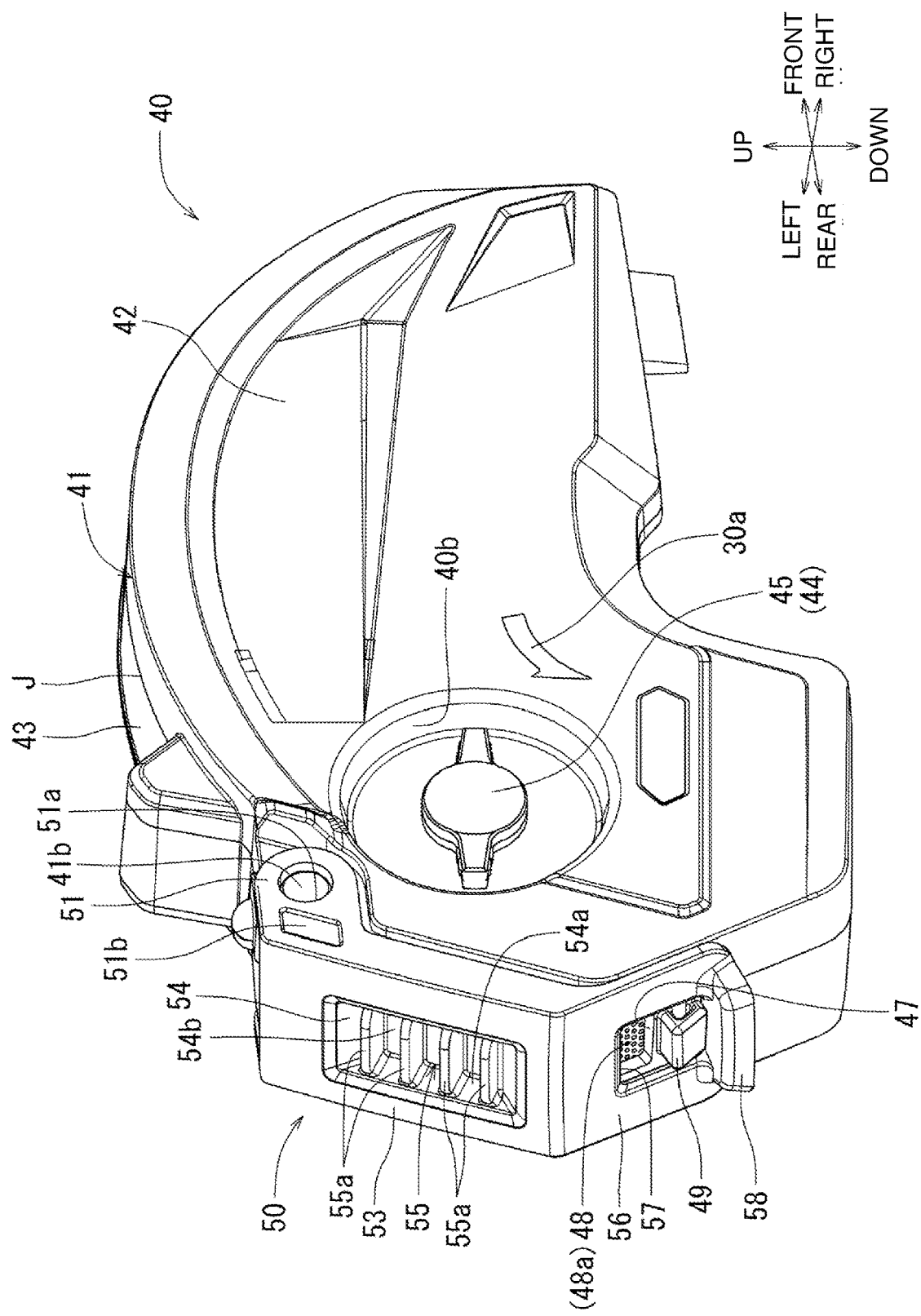
FIG. 9 is a perspective view of the dust collector box as viewed diagonally from the right rear.
Figure 10:
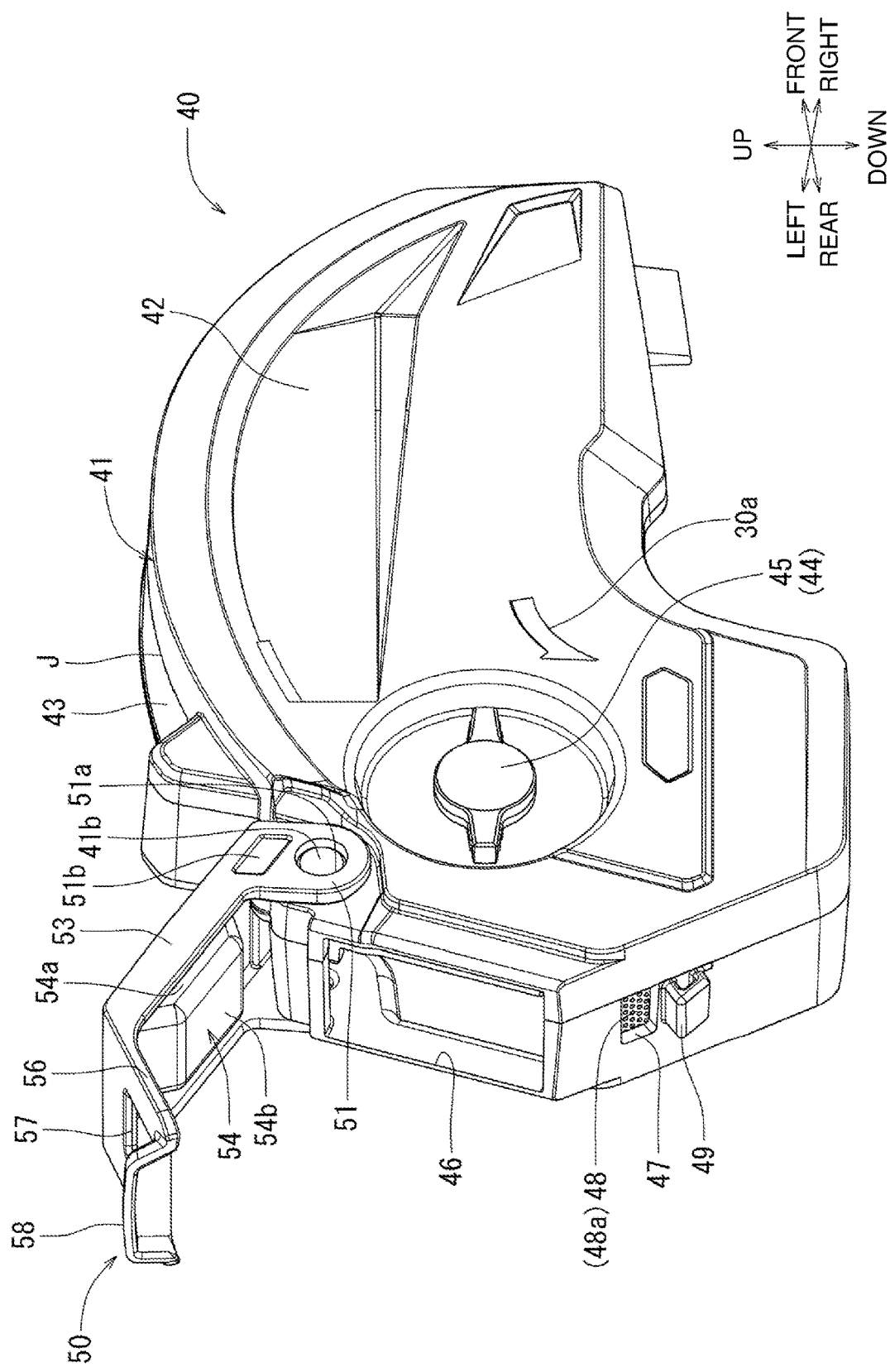
FIG. 10 is a perspective view of the dust collector box as viewed diagonally from the right rear, with its lid open.

The dust collector box 40 is detachably attached to the right side of the stationary cover 35. The dust collector box 40 collects chips flowing into it from inside the stationary cover 35. FIGS. 8 to 10 show the dust collector box 40 detached from the right side of the stationary cover 35. The dust collector box 40 includes a box body 41 formed from a synthetic resin. An arrow 30a on the right side of the box body 41 indicates the rotation direction of the blade 30 (counterclockwise in FIG. 1).

Figure 13:
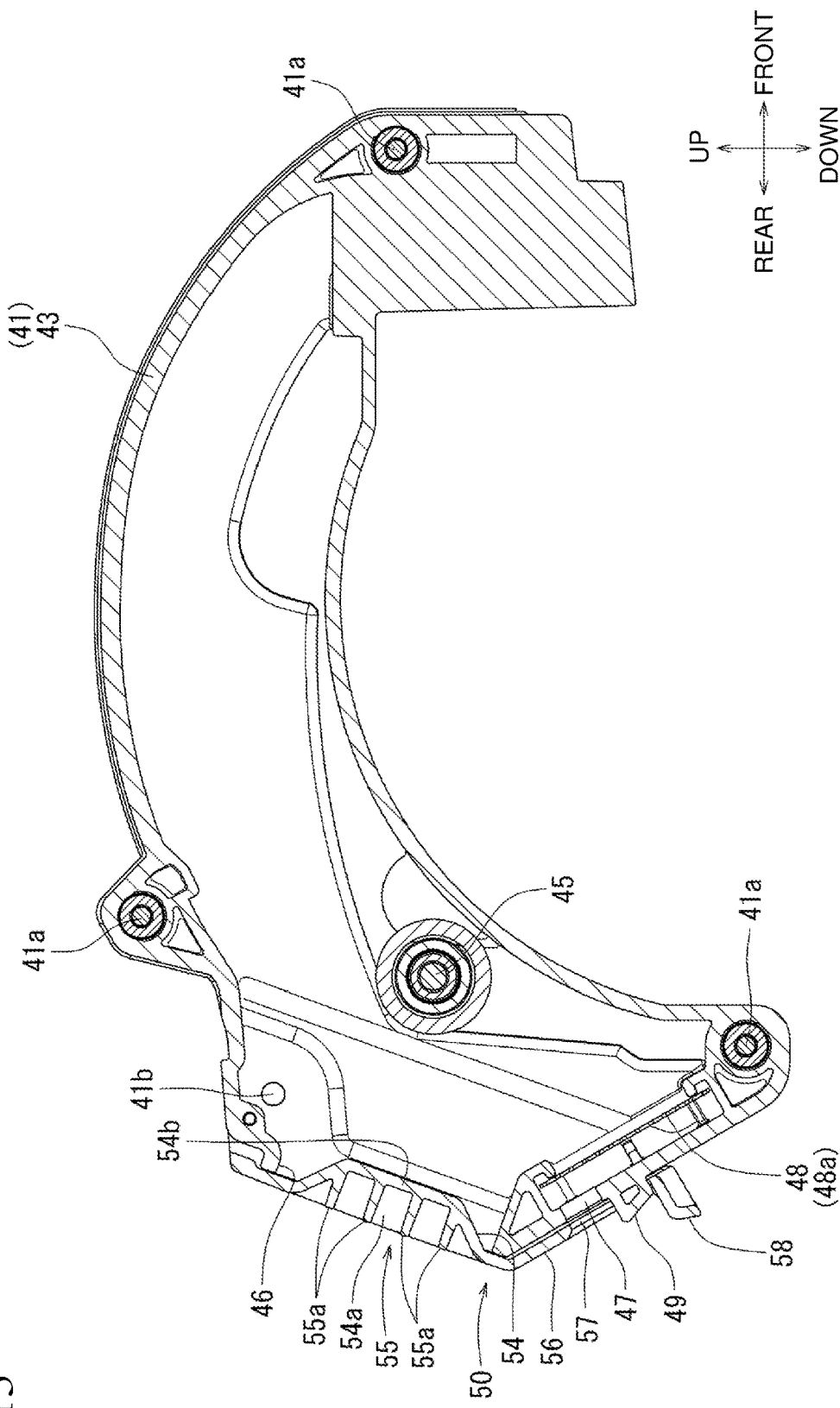
FIG. 13 is a longitudinal sectional view of the dust collector box, with the lid closed.

The box body 41 extends in the front-rear and vertical directions and is short in the lateral width direction (along the thickness of the blade 30). The box body 41 includes right and left halves. More specifically, the box body 41 includes a first body 42 on the right and a second body 43 on the left. The first body 42 and the second body 43 face each other and are connected together into the box body 41. The joint between the first body 42 and the second body 43 is denoted by character J in the drawings. As shown in FIG. 13, the first body 42 and the second body 43 are connected together with three fastener screws 41a in their front, rear, and upper portions. The three fastener screws 41a are placed through the second body 43 and tightened. The fastener screws 41a are thus invisible on the first body 42.

Figure 1:
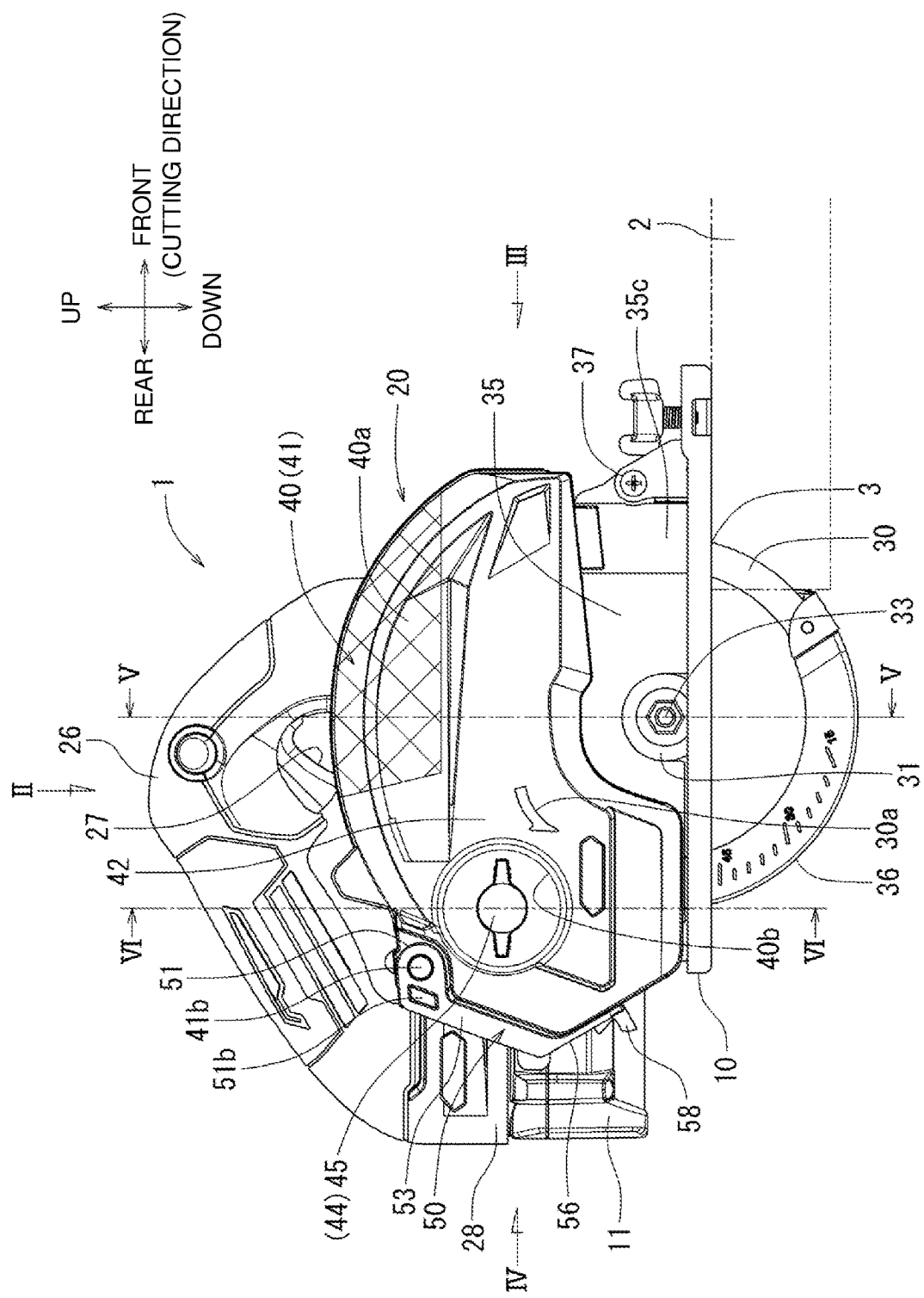
FIG. 1 is a right side view of a metalworking portable cutting machine according to an embodiment.
Figure 2:
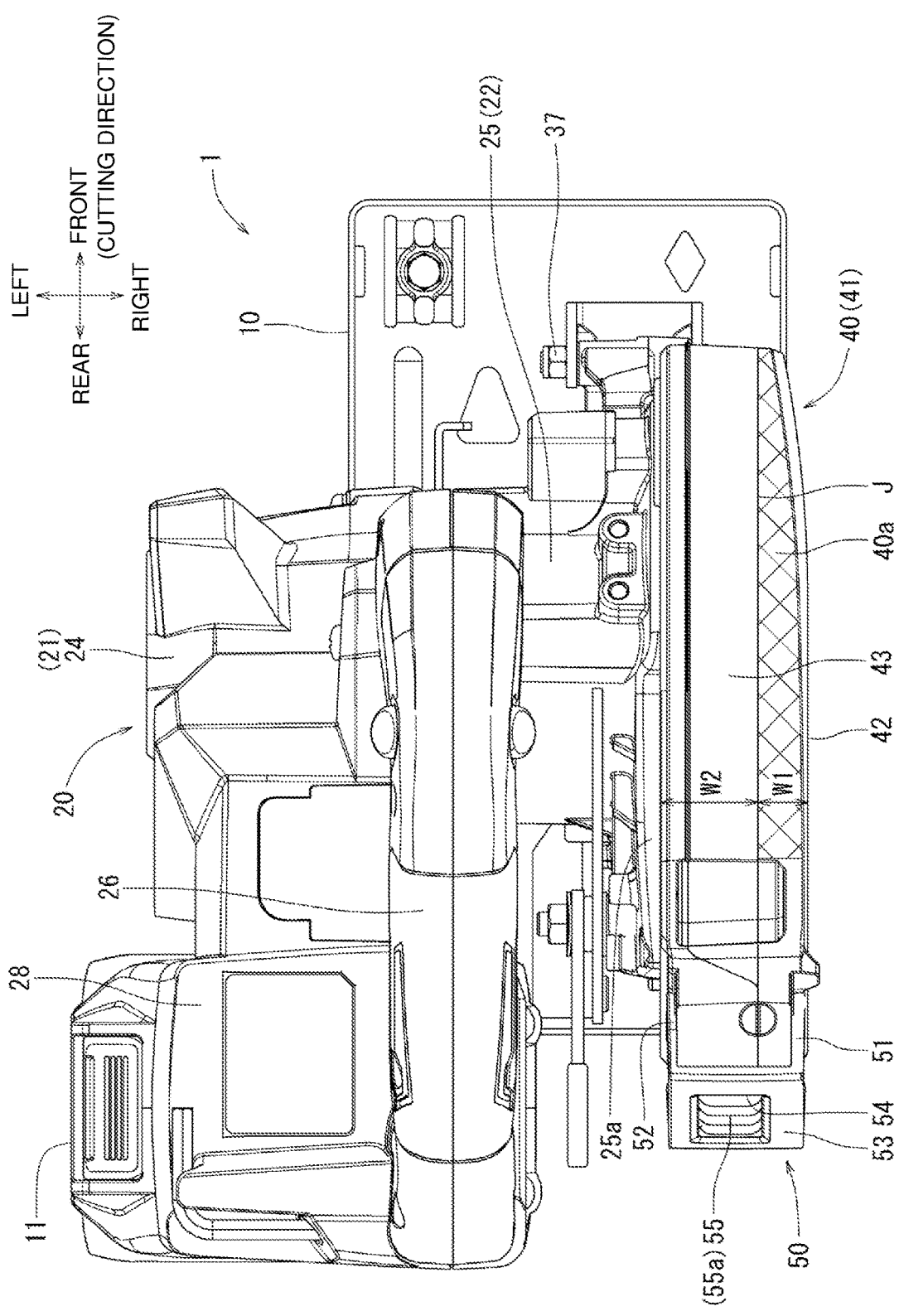
FIG. 2 is a plan view of the metalworking portable cutting machine as viewed in the direction indicated by arrow II in FIG. 1.
Figure 3:
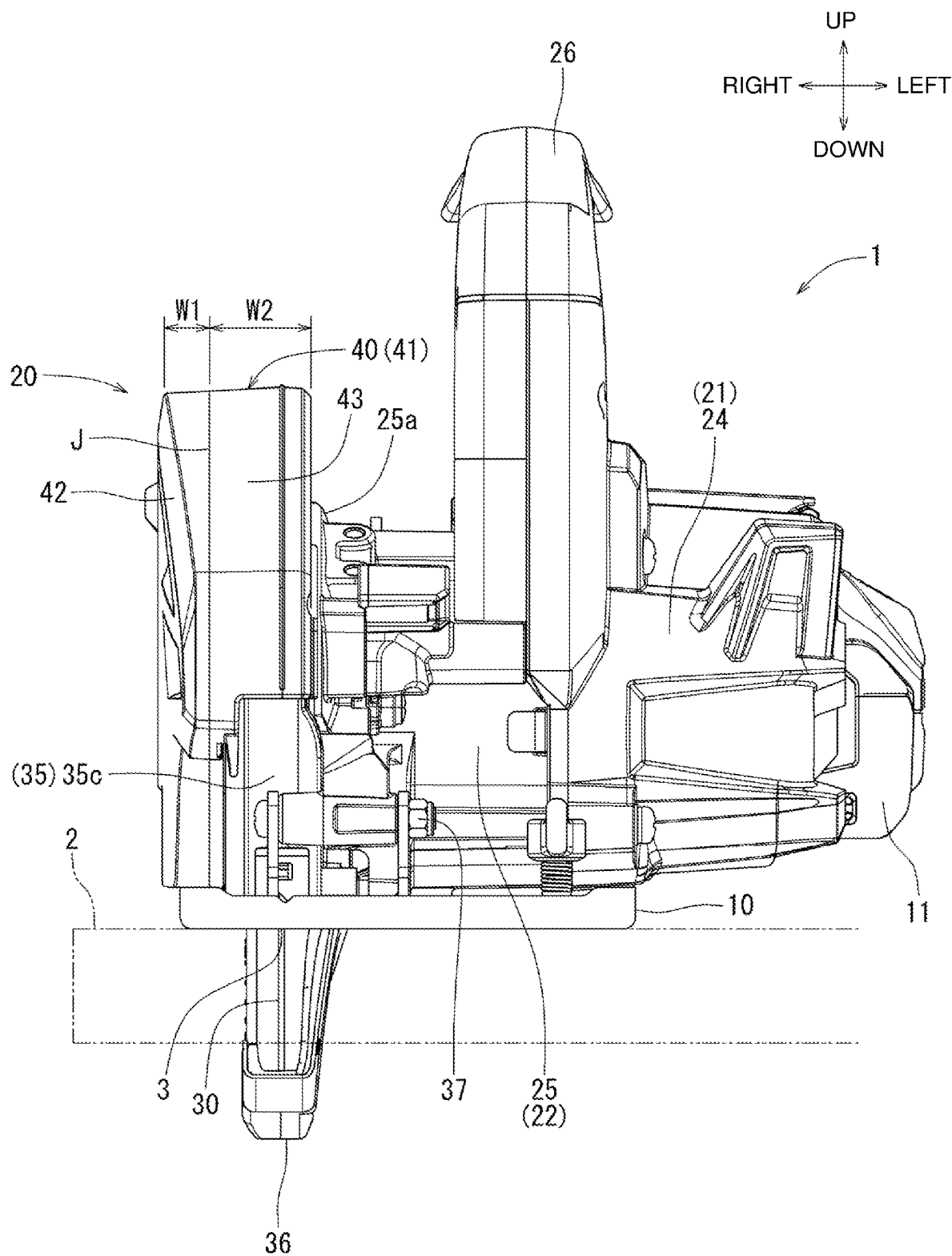
FIG. 3 is a front view of the metalworking portable cutting machine as viewed in the direction indicated by arrow III in FIG. 1.
Figure 4:
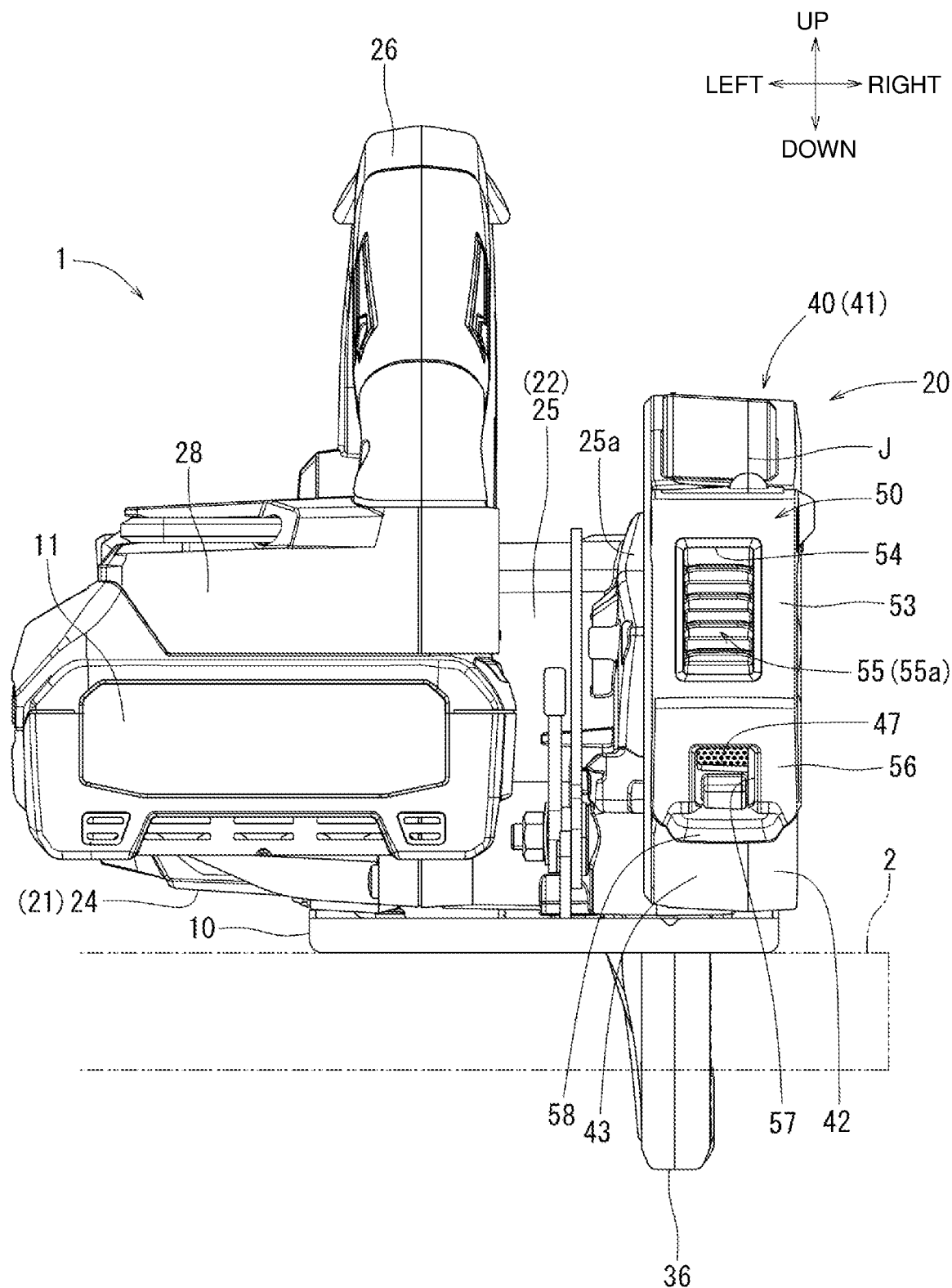
FIG. 4 is a rear view of the metalworking portable cutting machine as viewed in the direction indicated by arrow IV in FIG. 1.
Figure 11:
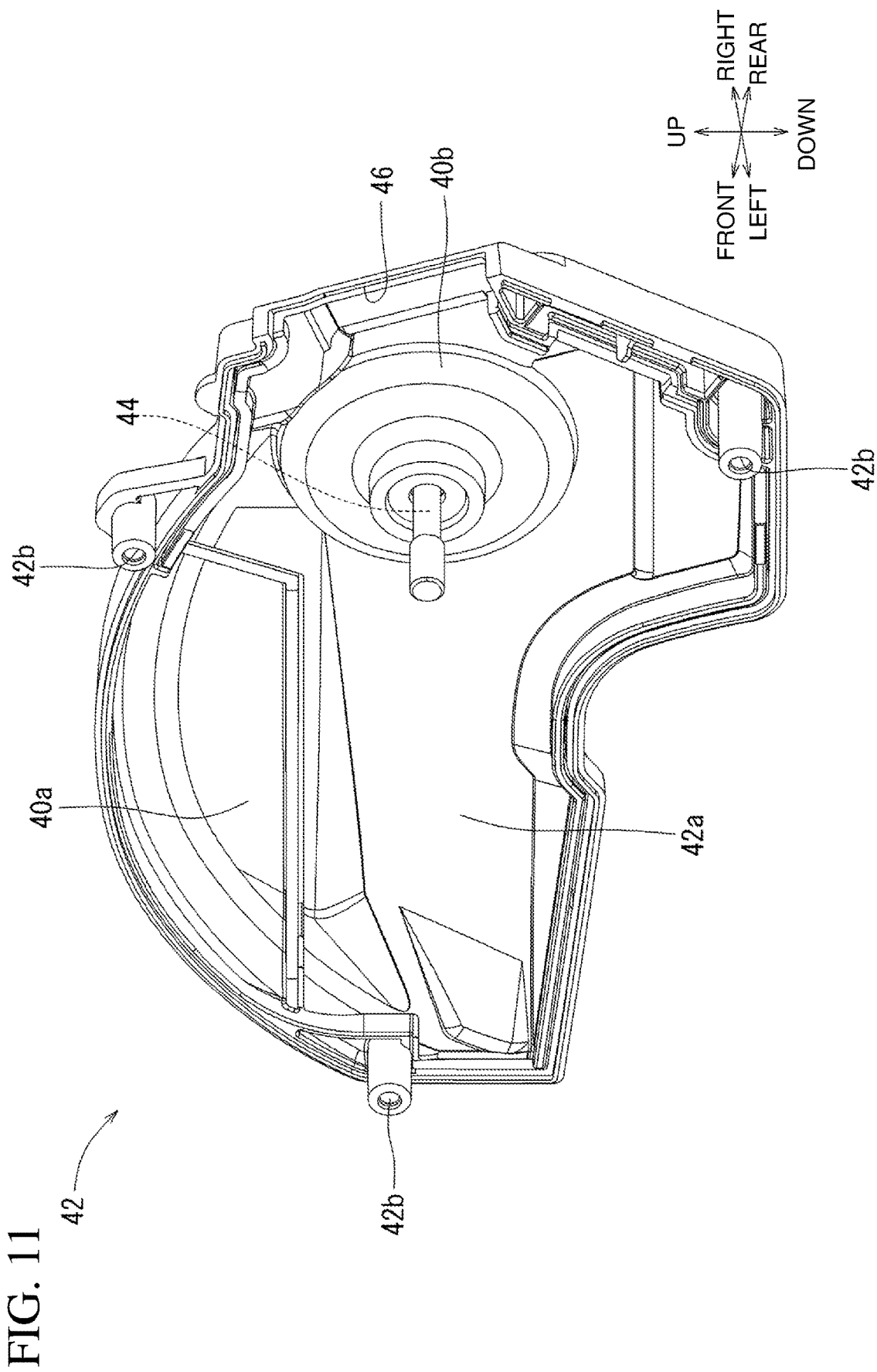
FIG. 11 is a perspective view of a first body as viewed diagonally from the left rear, showing the inside of a box body.

FIG. 11 shows the inner surface of the first body 42 separate from the second body 43. The first body 42 has three threaded holes 42b at its periphery for the fastener screws 41a to be tightened into. The first body 42 is formed from polycarbonate (first synthetic resin), which is a light-transmissive material. An aluminum heat-resistant plate 42a is connected to the inner surface of the first body 42 by press fitting. As shown in FIGS. 5 and 11, the heat-resistant plate 42a covers an area of the inner surface of the first body 42 extending rearward from the center of the blade 30. An area of the inner surface of the first body 42 extending frontward from the center of the blade 30 and a part of the intermediate area are covered with the heat-resistant plate 42a substantially in their lower half. The substantially upper half of these areas uncovered with the heat-resistant plate 42a and thus light-transmissive allows visual check of the volume of collected chips. In FIGS. 1 and 2, this light-transmissive area of the first body 42 (light-transmissive portion 40a) for the visual check of the volume of chips inside is cross-hatched.

As shown in FIGS. 6 and 11, the inner surface of the first body 42 is covered with the heat-resistant plate 42a throughout its vertical range in its intermediate area and an area rearward from the center of the blade 30. This improves the heat resistance of the first body 42 throughout its vertical range.

Figure 12:
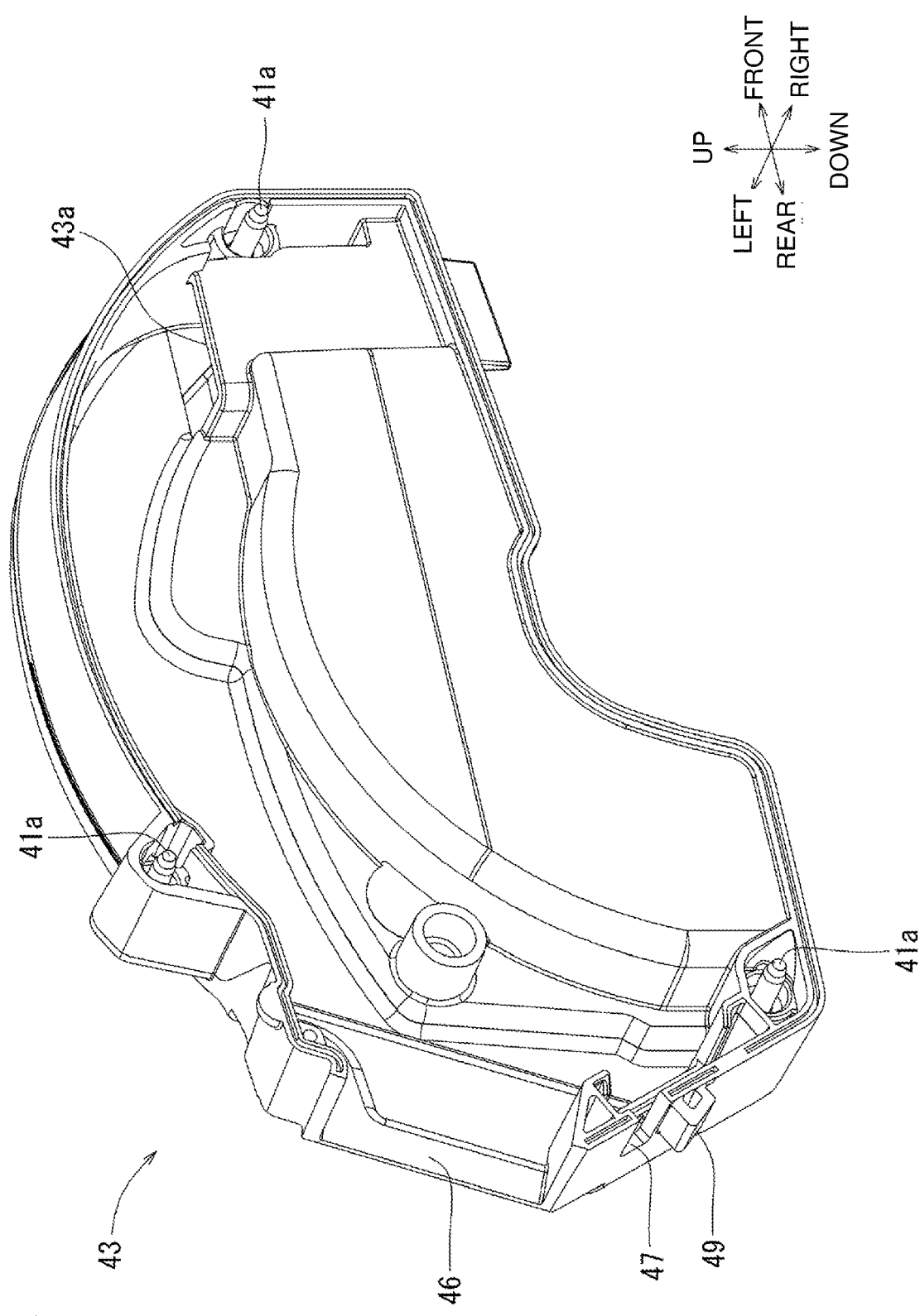
FIG. 12 is a perspective view of a second body as viewed diagonally from the right rear, showing the inside of the box body.

FIG. 12 shows the inner surface of the second body 43 separate from the first body 42. The second body 43 is formed from glass fiber-containing polyamide (second synthetic resin), which is a highly heat-resistant material. As shown in FIGS. 2, 3, 5, and 6, the second body 43 has a width W2 greater than a width W1 of the first body 42 in the direction along the thickness of the blade 30. The greater width W2 of the highly heat-resistant second body 43 further improves the heat resistance of the dust collector box 40.

As shown in FIG. 12, the second body 43 has a dust collecting port 43a at the front on its inner surface. The chips blown up into the stationary cover 35 are carried with an airflow generated by the rotating blade 30, guided through the dust collector duct 35b, and collected into the box body 41 through the dust collecting port 43a. The dust collecting port 43a corresponds to the inlet of the dust collector box 40. The dust collecting port 43a is located above the dust collector duct 35b.

As shown in FIG. 6, the dust collector box 40 is fastened to the stationary cover 35 with a fastener screw 44. As shown in FIGS. 6 and 7, the fastener screw 44 is tightened into a threaded hole 25b in the flange 25a on the right side of the gear housing 25. As shown in FIGS. 1 and 8 to 10, the fastener screw 44 is fitted with a large knob 45 at its right end. This improves the operability of the fastener screw 44 in tightening and loosening operations. The fastener screw 44 is loosened and removed from the threaded hole 25b to detach the dust collector box 40. The knob 45 is received in a circular recess 40b on the right side of the box body 41. This structure allows the dust collector box 40 to be compact in the lateral width direction without the knob 45 protruding.

As shown in FIGS. 10 and 13, the box body 41 has an outlet 46 for discharging chips and a vent 47 at its rear. The outlet 46 is a rectangular opening. The outlet 46 can be open and closed with a lid 50. As shown in FIGS. 8 to 10, the lid 50 is supported in a manner vertically pivotable about a support shaft 41b located at the rear of the box body 41. The support shaft 41b protrudes both to the right and to the left.

Figure 14:
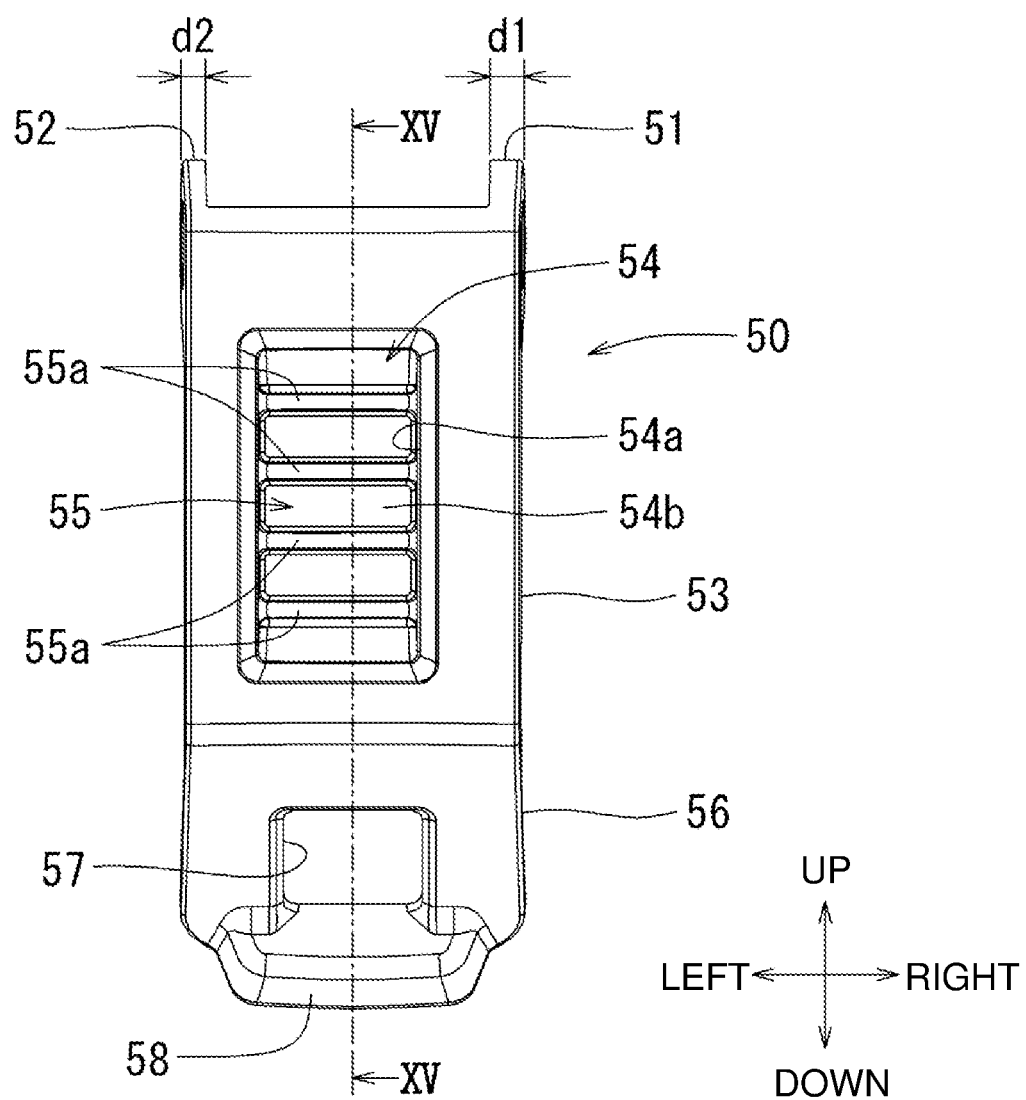
FIG. 14 is a rear view of the lid.
Figure 15:
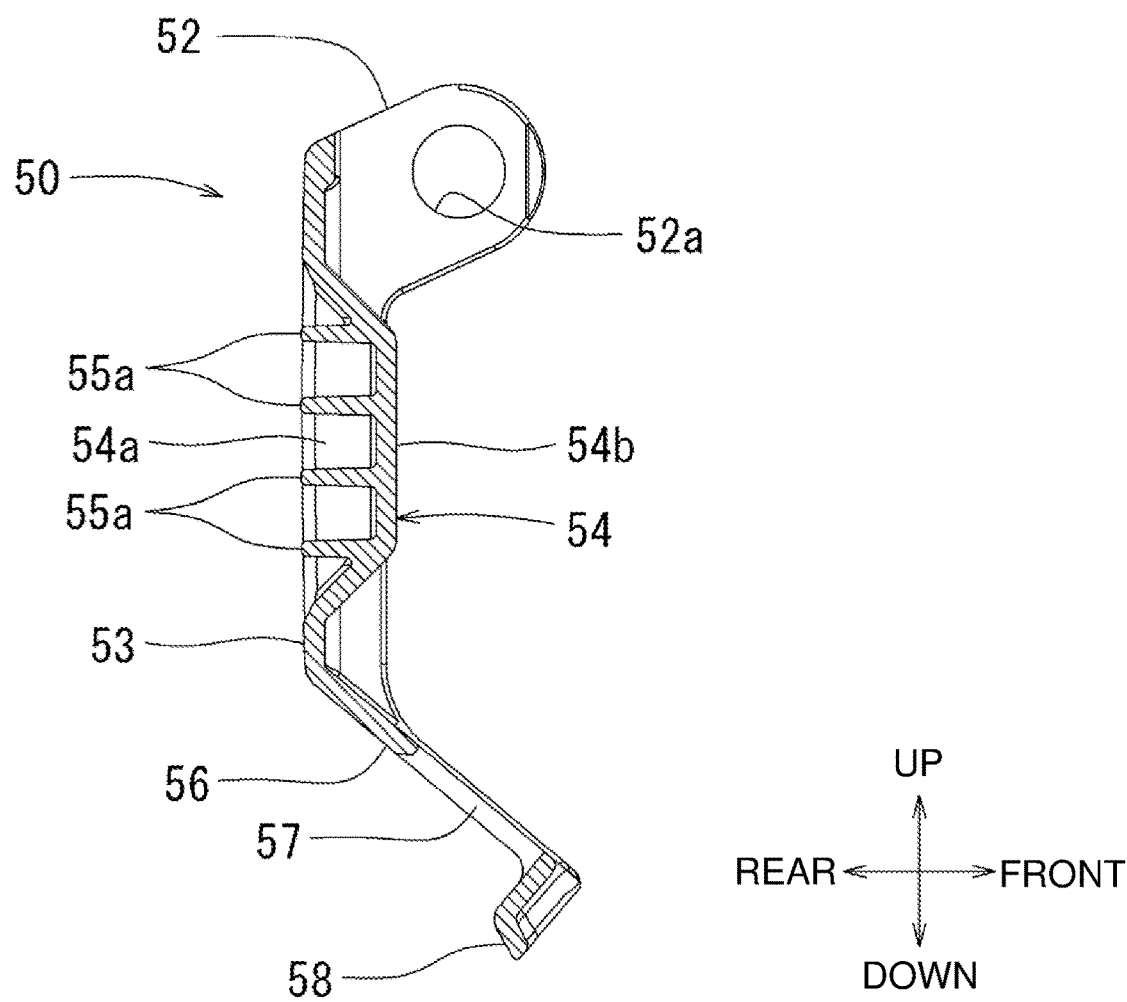
FIG. 15 is a longitudinal sectional view of the lid taken along line XV-XV in FIG. 14, as viewed in the direction indicated by arrows.

Similarly to the second body 43 in the box body 41, the lid 50 is formed from glass fiber-containing polyamide. As shown in FIGS. 14 and 15, the lid 50 has a pair of hinges, or a right hinge 51 and a left hinge 52, and an arm 53. The pair of right and left hinges 51 and 52 are connected to right and left portions of the support shaft 41b. The arm 53 extends from ends of the hinges 51 and 52 at an angle with the hinges 51 and 52. The right and left hinges 51 and 52 have connecting holes 51a and 52a. The support shaft 41b is placed through each of the connecting holes 51a and 52a to support the lid 50 in a vertically rotatable manner.

As shown in FIG. 14, the right hinge 51 has a thickness d1 greater than a thickness d2 of the left hinge 52. The right hinge 51 is thus harder than the left hinge 52. This facilitates attachment of the lid 50 to the box body 41. The harder right hinge 51 is connected to the support shaft 41b first. The less hard left hinge 52 can thus be easily connected to the support shaft 41b later. As shown in FIGS. 8 to 10, the right hinge 51 has a recess 51b on its right side. This reduces the cost for molding.

As shown in FIGS. 13 to 15, the arm 53 has a recess 54. The recess 54 is recessed toward the hinges 51 and 52 (frontward). The recess 54 includes a wall 54a and a bottom 54b. The wall 54a is looped and protrudes frontward. The wall 54a has its end covered with the bottom 54b. The recess 54 receives a heat dissipater 55. The heat dissipater 55 enhances the heat dissipation of the lid 50. This improves the operability of the lid 50 in opening and closing operations.

The heat dissipater 55 includes multiple (four in the present embodiment) ridges 55a. The four ridges 55a are received in the recess 54. Each ridge 55a extends laterally. The four ridges 55a are regularly spaced and extend parallel to one another. The four ridges 55a extend from the bottom 54b of the recess 54 perpendicularly to the direction of rotation of the lid 50, or parallel to the tangent to an arc centered on the support shaft 41b. The ends of the four ridges are connected to the wall 54a of the recess 54. The wall 54a connects the ends of the four ridges 55a together, improving the rigidity of each ridge 55a as a support. The four ridges 55a also improve the rigidity of the recess 54.

The four ridges 55a and the recess 54 increase the external surface area of the lid 50 to enhance the heat dissipation of the lid 50. As shown in FIG. 13, the recess 54 is located in the outlet 46 when the lid 50 is closed. The dust collector box 40 can thus have a compact rear portion when the lid 50 is closed. The recess 54 and the heat dissipater 55 located in the outlet 46 also facilitate the discharge of heat from the outlet 46 and its surroundings.

The lid 50 includes an engagement tab 56. The engagement tab 56 extends from an end of the arm 53 at an angle toward the hinges 51 and 52. The engagement tab 56 has a rectangular engagement hole 57. The engagement hole 57 has its lower edge elastically engaged with an engagement portion 49 on the rear surface of the dust collector box 40 when the lid 50 is closed. This elastic engagement between the lower edge of the engagement hole 57 and the engagement portion 49 holds the lid 50 being closed at the position.

The engagement portion 49 has its rear surface sloping frontward to the lower end. This allows easier operation in opening and closing the lid 50 (the operability of the lid 50 in opening and closing operations) for causing the lower edge of the engagement hole 57 to be engaged with or disengaged from the engagement portion 49.

As shown in FIGS. 9, 10, and 13, the dust collector box 40 has the vent 47 in its rear surface. The vent 47 is covered with a metal air-vent plate 48 commonly referred to as perforated metal. The air-vent plate 48 has multiple small air vents 48a. The air-vent plate 48 improves the heat resistance of the vent 47 and an airflow through the vent 47. As shown in FIGS. 9 and 13, the vent 47 faces an upper portion of the engagement hole 57 when the lid 50 is closed. The vent 47 is not blocked when the lid 50 is closed. This allows smooth airflow in the box body 41 and efficient discharge of heat from the box body 41 through the vent 47 when the lid 50 is closed.

A projection 58 is located at the lower end of the engagement tab 56. The projection 58 extends away from the box body 41. The projection 58 is pulled away from the box body 41 to detach the engagement portion 49 from the lower edge of the engagement hole 57. The projection 58 is then pulled upward to open the lid 50. To close the lid 50, the projection 58 is pulled downward toward the box body 41. This engages the lower edge of the engagement hole 57 with the engagement portion 49. The projection 58 improves the operability of the lid in opening and closing operations.

The metalworking portable cutting machine 1 according to the present embodiment includes the dust collector box 40 with the outlet 46 and the lid 50 to open or close the outlet 46. The lid 50 includes the heat dissipater 55. This allows efficient dissipation of heat from the lid through the heat dissipater 55 and thus improves the operability of the lid 50 in opening and closing operations.

The dust collector box 40 in the embodiment includes the box body 41 having right and left halves, or the first body 42 and the second body 43. The first body 42 is formed from polycarbonate (first synthetic resin) with the aluminum heat-resistant plate 42a integral with its inner surface. The second body 43 is formed from glass fiber-containing polyamide (second synthetic resin), which is a material more heat-resistant than polycarbonate. The use of the metal component in the first body 42 alone reduces the weight of the dust collector box 40 and allows the second body 43 to improve the heat resistance of the dust collector box 40.

The heat dissipater 55 in the embodiment includes the multiple ridges 55a. This increases the surface area of the lid 50 to allow efficient dissipation of heat from the lid 50.

The multiple ridges 55a in the embodiment are parallel to one another. This creates the channels for outside air to flow between the ridges 55a to enhance the heat dissipation of the lid 50.

The lid 50 in the embodiment is rotatably connected to the box body 41 of the dust collector box 40. The multiple ridges 55a extend perpendicularly to the direction of rotation of the lid 50. The lid 50 includes the wall 54a connecting the ends of the multiple ridges 55a together. This improves the rigidity of the multiple ridges 55a as a support.

The lid 50 in the embodiment includes the hinges 51 and 52 rotatably connected to the box body 41 of the dust collector box 40. The arm 53 extends from the ends of the hinges 51 and 52 at an angle with the hinges 51 and 52. The arm 53 has the recess 54 recessed toward the hinges 51 and 52. The arm 53 with this structure is less likely to deform and thus improves the rigidity of the lid 50 without increasing its size. The arm 53 having the recess 54 with its increased surface area also enhances heat dissipation.

The recess 54 in the embodiment is located in the outlet 46 when the lid 50 is closed. The dust collector box 40 can have a compact rear portion when the lid 50 is closed.

The recess 54 in the embodiment includes the wall 54a that is looped and extends from the arm 53 toward the hinges 51 and 52 and the bottom 54b covering the end of the wall 54a. The heat dissipater 55 includes the multiple ridges 55a protruding from the bottom 54b toward the arm 53. The heat dissipater 55 includes the multiple ridges 55a received in the recess 54 and thus is compact.

The lid 50 in the embodiment includes the engagement tab 56 extending from the end of the arm 53 at an angle toward the hinges 51 and 52. The engagement tab 56 has the engagement hole 57 engageable with the engagement portion 49 of the dust collector box 40. This structure holds the lid 50 being closed at the position. The hinges 51 and 52, the arm 53, and the engagement tab 56 are arranged in a curve along the rear surface of the box body 41 to improve the rigidity of the lid 50. This structure improves the operability of the lid 50 in opening and closing operations.

The dust collector box 40 in the embodiment has the vent 47 to allow entry of outside air into the dust collector box 40. The vent 47 is covered with the metal air-vent plate 48 with multiple air vents 48a. The engagement hole 57 in the lid 50 faces the vent 47 (air vents 48a). This improves airflow through the vent 47 (air vents 48a) when the lid 50 is closed.

The lid 50 in the embodiment includes the projection 58 extending from the end of the engagement tab 56 away from the box body 41. This structure improves the operability of the lid 50 in opening and closing operations.

The polycarbonate (first synthetic resin) in the first body 42 in the embodiment is light-transmissive. This allows visual check of the volume of collected chips through the light-transmissive portion 40a.

The box body 41 in the embodiment includes the first body 42 in a first direction along the thickness of the blade 30 and the second body 43 in a second direction along the thickness of the blade 30. The second body 43 has the width W2 along the thickness greater than the width W1 of the first body 42 along the thickness. This allows the dust collector box to have high heat resistance.

The second body 43 in the dust collector box 40 in the embodiment is formed from a material containing polyamide as the second synthetic resin and also containing glass fiber. This allows the second body 43 to have high heat resistance.

The embodiment described above may be modified variously. For example, although the four ridges 55a on the heat dissipater 55 extend laterally in the above embodiment, the ridges 55a may extend vertically. In some embodiments, the heat dissipater 55 may include multiple ridges arranged in a lattice pattern.

Although the multiple ridges 55a are received in the recess 54 with their tops lower than the surface of the arm 53 in the above embodiment, the recess 54 may be eliminated, or the multiple ridges may protrude from a part of the surface of the arm 53.

Although the thicknesses d1 and d2 of the right and left hinges 51 and 52 of the lid 50 are different in the above embodiment, the hinges 51 and 52 may have the same thickness. The recess 51b, which is a lightening portion, may be eliminated.

Although the lid 50 vertically pivots to be open and closed in the above embodiment, the lid may be vertically slidable to be open and closed and may include the heat dissipater 55 in the above embodiment.

The second body 43 may be formed from a highly heat-resistant resin in place of glass fiber-containing polyamide.

Similarly to the second body 43, the lid 50 may be formed from glass fiber-containing polyamide or any other highly heat-resistant resin.

The heat-resistant plate 42a in the first body 42 may be a heat-resistant plate of iron rather than aluminum.

The first body 42 in the box body 41 may also be formed from glass fiber-containing polyamide, similarly to the second body 43, except at a window for the visual check of the volume of collected chips. In this case, the heat-resistant plate 42a may be eliminated. The window for the visual check of the volume of collected chips may be a separate transparent plate formed from a light-transmissive polycarbonate and fitted into the window. The box body may be a one-piece structure, for example produced by blow molding, rather than having right and left halves.

The metalworking portable cutting machine may include a diamond wheel or a grinding disc rather than being a metal cutter including a tipped saw blade for metal.

REFERENCE SIGNS LIST 1 metalworking portable cutting machine (metal cutter)
2 workpiece
3 cutting portion
10 base
11 battery pack
20 cutting machine body
21 electric motor (brushless motor)
22 reduction gear
23 output shaft
24 motor housing
25 gear housing
25a flange
25b threaded hole
26 handle
27 switch lever
28 battery mount
30 blade
30a arrow (rotation direction of blade 30)
31 outer flange
32 inner flange
33 fastener screw
35 stationary cover
35a arrow (rotation direction of blade 30)
35b dust collector duct
35c metal plate
35d fastener screw
36 movable cover
37 swing support
40 dust collector box
40a light-transmissive portion
40b recess
41 box body
41a fastener screw
41b support shaft
42 first body
42a heat-resistant plate
42b threaded hole
W1 width of first body 42
43 second body 43a dust collecting port
W2 width of second body 43
44 fastener screw
45 knob
46 outlet
47 vent
48 air-vent plate
48a air vent
49 engagement portion
50 lid
51 hinge (right)
51a connecting hole
51b recess (lightening portion)
d1 thickness of hinge 51
52 hinge (left)
52a connecting hole
d2 thickness of hinge 52
53 arm
54 recess
54a wall
54b bottom
55 heat dissipater
55a ridge
56 engagement tab
57 engagement hole
58 projection

What is claimed is:

1. A metalworking portable cutting machine, comprising:
a cutting machine body including a blade; and
a dust collector box to collect a chip resulting from cutting, the dust collector box including a box body, the box body including
   a first body comprising a first synthetic resin, the first body including a metal plate integral with an inner surface of the first body, and
   a second body comprising a second synthetic resin being more heat-resistant than the first synthetic resin.

2. The metalworking portable cutting machine according to claim 1, wherein
the dust collector box includes
   an outlet to discharge the chip, and
   a lid to open or close the outlet, and
the lid includes
   a hinge rotatably connected to the box body,
   an arm extending from an end of the hinge at an angle with the hinge, and
   a recess recessed from the arm toward the hinge.

3. The metalworking portable cutting machine according to claim 2, wherein
the recess is located in the outlet with the lid being closed.

4. The metalworking portable cutting machine according to claim 2, wherein
the recess includes
   a wall being looped and extending from the arm toward the hinge, and a bottom covering an end of the wall.

5. The metalworking portable cutting machine according to claim 2, wherein
the lid includes an engagement tab extending from an end of the arm at an angle toward the hinge, and
the engagement tab has an engagement hole engageable with an engagement portion of the dust collector box.

6. The metalworking portable cutting machine according to claim 5, wherein
the dust collector box includes a metal air-vent plate having a plurality of air vents, and
the engagement hole faces the metal air-vent plate.

7. The metalworking portable cutting machine according to claim 5, wherein
the lid includes a projection extending from an end of the engagement tab away from the box body.

8. The metalworking portable cutting machine according to claim 1, wherein
the first synthetic resin in the first body is light-transmissive.

9. The metalworking portable cutting machine according to claim 8, wherein
the first body is located in a first direction along a thickness of the blade,
the second body is located in a second direction along the thickness of the blade, and
the second body has a width along the thickness greater than a width of the first body along the thickness.

10. The metalworking portable cutting machine according to claim 1, wherein
the first body is located in a first direction along a thickness of the blade,
the second body is located in a second direction along the thickness of the blade, and
the second body has a width along the thickness greater than a width of the first body along the thickness.

11. The metalworking portable cutting machine according to claim 1, wherein
the second body comprises a material containing polyamide as the second synthetic resin and containing glass fiber.

12. The metalworking portable cutting machine according to claim 8, wherein
the second body comprises a material containing polyamide as the second synthetic resin and containing glass fiber.

* * * * *